US00RE38655E

(19) United States
(12) Reissued Patent
Hoffmann et al.

(10) Patent Number: US RE38,655 E
(45) Date of Reissued Patent: Nov. 23, 2004

(54) TORSION VIBRATION DAMPER

(75) Inventors: Joachim Hoffmann, Puebla (MX); Steffen Lehmann, Ettlingen (DE); Andreas Posch, Bühl (DE)

(73) Assignee: LuK Lamellen und Kupplungsbau Beteiligungs KG, Buhl (DE)

(21) Appl. No.: 10/388,729

(22) Filed: Mar. 12, 2003

Related U.S. Patent Documents

Reissue of:
(64) Patent No.: 6,293,383
Issued: Sep. 25, 2001
Appl. No.: 09/478,433
Filed: Jan. 6, 2000

U.S. Applications:
(63) Continuation of application No. PCT/DE99/01346, filed on May 4, 1999.

(30) Foreign Application Priority Data

May 7, 1998 (DE) ..... 198 20 354

(51) Int. Cl.[7] ..... F16D 13/68; F16D 3/14; F16D 3/66

(52) U.S. Cl. ..... 192/213.22; 192/204

(58) Field of Search ..... 192/213.22, 213.12, 192/204; 464/63, 68

(56) References Cited

U.S. PATENT DOCUMENTS

| | | | | | |
|---|---|---|---|---|---|
| 4,586,595 | A | * | 5/1986 | Hartig et al. | 192/213.12 |
| 4,890,712 | A | * | 1/1990 | Maucher et al. | 192/213.12 |
| 5,213,188 | A | * | 5/1993 | Feser et al. | 192/213.12 |
| 5,238,096 | A | * | 8/1993 | Ament et al. | 192/213.12 |
| 5,246,398 | A | * | 9/1993 | Birk et al. | 464/63 |
| 5,249,660 | A | * | 10/1993 | Feldhaus et al. | 192/204 |
| 5,771,999 | A | * | 6/1998 | Kleifges et al. | 192/213.12 |
| 5,795,230 | A | * | 8/1998 | Lefevre | 464/63 |
| 6,016,899 | A | * | 1/2000 | Ament | 192/204 |

* cited by examiner

*Primary Examiner*—Rodney H. Bonck
(74) *Attorney, Agent, or Firm*—Darby & Darby

(57) ABSTRACT

The invention relates to a torsion vibration damper having a main damper containing energy accumulators and a friction device, as well as a preliminary damper containing energy accumulators and a friction device.

54 Claims, 7 Drawing Sheets

TORSION VIBRATION DAMPER

Matter enclosed in heavy brackets [ ] appears in the original patent but forms no part of this reissue specification; matter printed in italics indicates the additions made by reissue.

This is a continuation of International Application No. PCT/DE99/01346, filed May 4, 1999, the entire disclosure of which is hereby incorporated by reference.

The invention relates to a torsion vibration damper, more particularly for motor vehicle clutch discs, with at least one preliminary damper acting in a predetermined angular area and having energy accumulators of lower stiffness, and at least one main damper acting in a predetermined angular area and having energy accumulators of greater stiffness, wherein the energy accumulators are active between the respective input and output parts of the preliminary and main dampers, and the output part of the torsion vibration damper is a hub provided with inner profiled sections to fit onto a gearbox shaft, as well as a flange forming the output part of the main damper is provided with inner profiled sections so that the inner profiled sections engage with the outer profiled sections of the hub and through this profiling the flange of the main damper is able to execute restricted relative rotation relative to the hub, as well as having at least one disc part which forms the input part of the main damper and holds the friction linings, and with at least one friction device.

Torsion vibration dampers with preliminary and main dampers having associated friction devices are known for example from DE 40 26 765 which each have a separate friction device for the main and for the preliminary damper, wherein the preliminary damper has a two-stage friction build-up and two-stage mounted energy accumulators for adapting to the different conditions. The drawback with this type of torsion vibration damper is the inability to dampen by simple means the torsion vibrations of the pressure plate at high speeds, such as occur for example during engagement and disengagement processes, so that the turning path of the preliminary damper is exceeded and the preliminary damper strikes against its restricting stop and thereby causes clutch noises which cannot be tolerated. Furthermore a construction of this kind is relatively complicated and the assembly becomes correspondingly expensive through the numerous structural elements used, which is all the more apparent if additional measures have to be used to counteract the clutch knocking previously described.

The object of the present invention is therefore to produce a torsion vibration damper of the kind mentioned above which provides the possibility of damping large torsion vibration amplitudes at high speeds, uses a minimum number of component parts and allows simple assembly.

According to the main claim this is achieved in that a torsion vibration damper, more particularly for motor vehicle clutch discs, is provided having at least one preliminary damper acting in a predetermined angular area and having energy accumulators of lower stiffness, and at least one main damper acting in a predetermined angular area and having energy accumulators of greater stiffness, wherein the energy accumulators are active between the respective input and output parts of the preliminary and main dampers, and the output part of the torsion vibration damper is a hub provided with inner profiled sections to fit onto a gearbox shaft, as well as a flange forming the output part of the main damper is provided with inner profiled sections so that the inner profiled sections engage with the outer profiled sections of the hub and through this profiling the flange of the main damper is able to execute restricted relative rotation relative to the hub, as well as having at least one disc part which forms the input part of the main damper and holds the friction linings, at least one friction device, wherein a spring which engages in the outer profiled sections of the hub is provided and controls at least one part of the friction device and defines the friction engagement.

It is thereby advantageous to make the hub two-part wherein an additional hub part with outer profiled section can hold the inner profiled section of the spring, as well as to provide a restricted relative rotation forming a free angle between the spring and the hub whereby the spring is entrained with the input part and thus a friction moment does not occur in the normal active area of the preliminary damper, that is friction is delayed until the free angle is used up and a high friction gradient, a so-called friction jump, ensues through the inner profiled section of the spring stopping against the outer profiled section of the hub.

Furthermore it is advantageous to set up the relative rotation between the spring and hub so that a delay with a free angle a is caused between the spring and hub, wherein this free angle a is the range from ±2° to ±3°, preferably ±2.5°.

To perform its function as a control element of the friction device the spring has in a preferred embodiment an inner profiled section complementary with the external profiled section of the hub disc and forming teething with the external profiled section of the hub disc to thereby allow the said free angle.

Advantageously one design form has the preliminary damper arranged with its input and output part so that the output part of the preliminary damper is connected rotationally secured with the hub and the spring is tensioned between the input part of the preliminary damper and the disc part and/or a component part fixedly connected thereto. For design reasons in a further embodiment it is proposed that the previously mentioned component part connected fixed to the disc part is a second disc part set apart by spacer bolts and on which to optimise the friction coefficients a friction ring is fixed with which the spring forms the friction face.

The advantageous construction of a further embodiment of the spring is produced where the spring has an external profiled section with at least one radially outwardly pointing tongue wherein advantageously several tongues are provided which are spread out over the circumference and which have radially outwards an approximately semicircular recess. Double the number of friction tongues are now produced which form on the preliminary damper which is preferably designed as a friction face, an additional friction surface between the spring and preliminary damper.

In a further advantageous design the tongues are widened out at their radial outer side so that the friction face between the spring and tongues can be enlarged and the friction can thereby be improved.

Further advantageous design possibilities for optimising the friction surface between the spring and input part of the preliminary damper are offered wherein the input part of the preliminary damper has, on the axial side facing the spring in the area of the contact surface between the input part and the spring tensioned with a contact bearing angle $\beta$, a rounded end which has a pitch angle such that the bearing angle $\beta$ of the spring is approximately $\beta=0$.

A further advantageous design relates to the input part of the preliminary damper which has at least one axially extending pin on the axial side facing the spring, wherein an arrangement of several pins spread uniformly over a circumference of constant diameter is advantageous and whose number corresponds to the recesses of the tongues formed on the outer circumference of the spring. It is further advantageous if the pins engage with play in the recesses of the tongues and thus serve for pre-centring during assembly. The play between the tongues and pins is thereby advantageously greater than the free angle of the teething between the spring and hub, so that the control of the friction device is not impeded. The pins can in further embodiments serve as stops for restricting the spring path.

Further advantageous design possibilities relate to the friction ring connected to the disc part and which in one design model is advantageously formed so that it is press-fitted into a bore provided in the disc part through at least one, and preferably several axially extending hollow pins spread evenly over the circumference, so that the friction ring is fixed on the disc part during assembly and is connected rotationally secured to the disc part.

In a further embodiment the friction ring has a ring located on the outer circumference and raised axially in the direction of the spring whereby its ring face drops advantageously towards its inner diameter and the ensuing ring face forms relative to the inner face of the ensuing ring a phase angle $\gamma$ which is advantageously designed so that the contact bearing angle $\beta$ of the spring on the friction ring is approximately $\beta=0$ and thus an improved friction surface is formed. The formation of the raised ring has the advantage that radially outside the outer circumference of the raised ring of the friction ring there is a further plate spring which belongs to a friction device of the main damper and which thereby is formed without taking up additional axial structural space. It is supported on one side on the non-raised inner ring face of the friction ring and on the other side on the axially aligned tabs of the control plate for the second stage of the main damper so that the friction ring forms at least a part of the friction device of the preliminary and main damper.

A further development of the invention relates to the arrangement and design of the preliminary damper for space-saving fitting of the spring engaging in the hub. Advantageous for this is an arrangement where the preliminary damper is housed axially between the disc part and a second associated disc part so that the spring can be tensioned directly between one of the two disc parts or a friction ring attached thereon and the preliminary damper. In principle however other design forms are possible wherein the preliminary damper has an axial stagger relative to the main damper and the spring is tensioned between the first disc part or a component part connected thereto and the input part of the preliminary damper. Furthermore the first disc part can be attached in the axial direction centrally on the hub whereby the preliminary damper and flange can be mounted axially on the same side or the disc part can be mounted flanked on both sides.

To fix the output part of the preliminary damper on the output part of the main damper in one embodiment it is proposed that pins attached to the output part of the preliminary damper are fitted into windows provided in the output part of the main damper for receiving the energy accumulators. These pins are provided complementary with the two radially inner corners of each window on the input part of the preliminary damper, are shaped out axially and are engaged in the corners of the windows. They simultaneously centre the preliminary damper on the output part of the main damper.

A further embodiment according to the invention relates to the design of the hub wherein the external profiled section of the hub is continued in a cone which has for this purpose a positive-locking inner profiled section or an axially mounted positive-locking profiled section and wherein the spring engages by its inner profiled section in an external profiled section of the cone. This solution produces a significant advantage with regard to assembly since through the variation of the cone which is simple to produce different free angles of the spring can be created without changing the hub or spring.

The invention will now be explained in further detail with reference to the embodiments shown in the accompanying FIGS. 1 to 9 in which.

Figure 1:
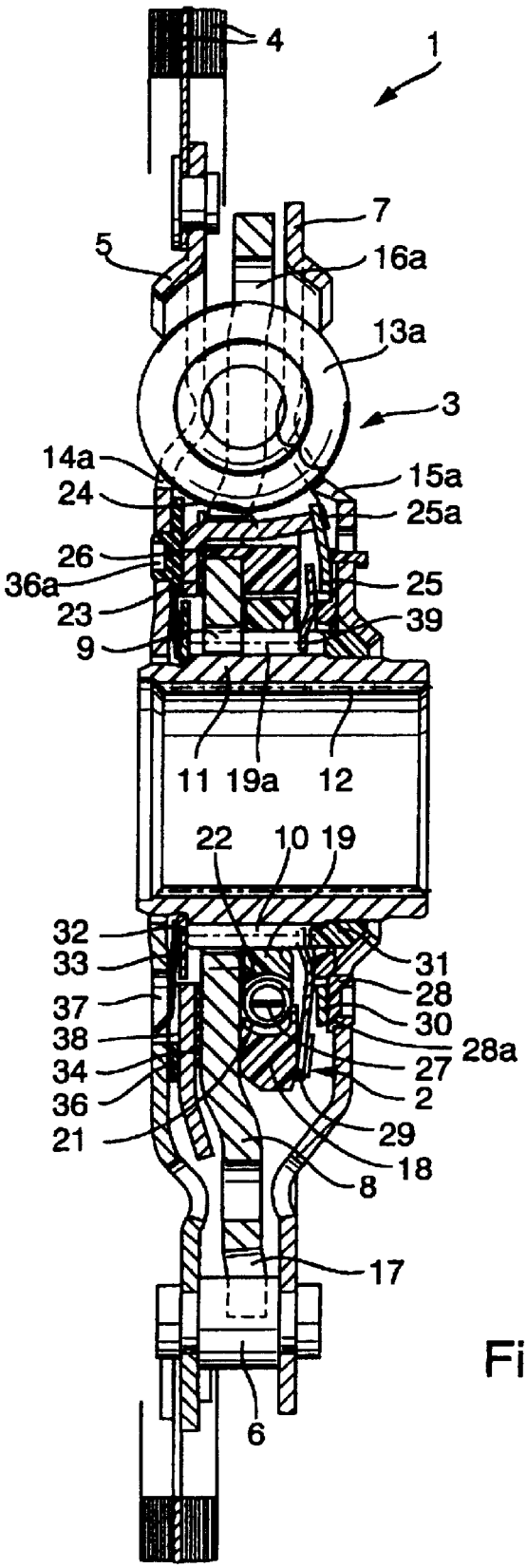
FIG. 1 shows the torsion vibration damper in longitudinal section.

The torsion vibration damper 1 shown in the drawings has a preliminary damper 2 and a main damper 3. The input part of the torsion vibration damper 1 which represents the input part of the main damper 3 is formed by a first disc part 5 (not shown complete) supporting friction linings 4 as well as by a second disc part 7 connected rotationally secured to the first part by spacer bolts 6. The output part of the main damper 3 is formed by a flange 8 which has an internal profiled section, preferably internal teeth 9, which engage in an external profiled section, preferably external teeth 10, of a hub 11. Between the external teeth 10 of the hub 11 and the internal teeth 9 of the flange there is a tooth flank play in the circumferential direction which corresponds to the active area of the preliminary damper 2. The hub 11 furthermore has internal teeth 12 for fitting rotationally secured but axially displaceable on a gearbox input shaft.

The main damper 3 has a first set of coil compression springs 13a which can comprise a pair of coil compression springs boxed in each other, for the first main damper stage, which are provided in window-shaped recesses 14a, 15a of the first and second disc part 5, 7 on one side as well as in window-shaped cut-out sections 16a of the flange 8. The action of the coil compression springs 13a is activated through the relative rotation of the recesses 14a, 15a opposite the recesses 16a, after using up the free angle, in which the preliminary damper is active, between the hub 11 and flange 8. A second set of coil compression springs 13b (FIG. 1a) of higher stiffness, which can also consist of coil compression springs boxed in each other, but off-set on a circumference of the same diameter by an angle of preferably 90° relative to the coil springs of the first stage, for the second main damper stage is set in the recesses 14b, 15b (FIG. 1a) of the disc parts 5, 7 and in the window-shaped recesses 16b (FIG. 1a) of the flange 8 wherein the recesses 16b have a larger cut-out section than the length of the coil compression springs 13b whereby during relative rotation of the disc parts 5, 7 opposite the flange 8 the action of this coil spring set 13b is only used with greater turning angles and thus a second damper stage of the main damper is formed. Between the flange 8 and the disc part 5 is a friction control part 23 which has recesses 23a (FIG. 1a) for housing the coil spring set 13b (FIG. 1a) and on these recesses 23a axially aligned tabs 23b (FIG. 1a) which engage in the flange 8 and during rotation of the flange 8 about a turning angle which activates the second main damper stage, entrain the friction control part 23 whereby a friction engagement which only acts in the second main damper stage is produced on a friction disc 34 attached between the friction control part 23 and the flange 8. Furthermore the friction control part 23 has axially extending tabs 24 for holding a plate spring 25 which is supported on a further friction ring 28 fixed on the disc part 7 and thus defines the friction engagement on the friction discs 28 and 26. The rotation of the main damper is restricted by the spacer bolts 6, which connect the two disc parts 5 and 7 together, stopping against the end contours of the cut-out sections 17 of the flange 8 into which they project axially.

The preliminary damper 2 is mounted axially between the flange 8 and the disc part 7. The input part 18 made from plastics preferably by injection moulding is connected rotationally secured to the flange 8 through pins 26 projecting axially into the corners of the recesses 16 of the flange 8. The output part 19 of the preliminary damper 2 made from plastics preferably by means of injection moulding is connected rotationally secured through internal teeth 19a to the external teeth 10 of the hub 11 whereby as a result of the tooth flank play of the internal teeth 9 of the flange 8 and the external teeth 10 of the hub 11 relative rotation is possible between the output part 19 and input part 18 level with the active area of the preliminary damper 2 against the action of the coil compression springs 27 housed in the window-shaped recesses 21, 22 in the output part 19 and the input part 18. The recesses 22 of the output part 19 provided for controlling the coil compression springs 27 are divided alternately into two groups on a circumference of constant diameter of the preliminary damper 2 whereby the recesses of the one group arranged on the same circumference are formed longer in the circumferential direction compared to the other group whereby the coil compression springs 27 housed in this group are only controlled in the event of greater relative rotations to thereby form a second preliminary damper stage. It is advantageous if the coil compression springs 27 belonging to this group have at the same time a higher stiffness.

The friction device of the torsion vibration damper 1 is made up as follows: the basic friction of the main damper 3 takes place through friction engagement of the friction control disc 23 and the disc part 5 on the friction disc 36 which is connected rotationally secured to same by means of hollow pins 36a, wherein the friction engagement takes place over the entire active area of the main damper 3 and the spring 29 which is supported on the friction ring 28 and on the input part 18 of the preliminary damper 2 which is supported in turn on the flange 8 defines the friction moment. The friction moment of the friction disc 34 already mentioned above and acting in the second main damper stage, between the friction control part 23 and the disc part 5, is likewise fixed by the plate spring 30 which is supported on the friction control part 23. This is joined by a friction moment arising at the friction disc 28 and acting in the entire active area of the main damper 3 and which is defined by the plate spring 29 which is supported on the input part 18, formed as a friction ring, of the preliminary damper 19. After using up the free angle which the spring 29 forms during engagement of its internal teeth 39 with the external teeth 10 of the hub 11, the friction also becomes active in the preliminary damper 2 which leads to a delayed friction jump in the preliminary damper 2. The basic friction of the preliminary damper arises at the friction disc 32 which adjoins the inner circumference of the friction disc 36 and is pressed against the hub 11 by means of a plate spring 33 supported on the disc part 5 and provided with tooth-like outer profile, whereby a part of the radially longer formed teeth engages on one side in recesses 37 of the disc part 5 and thereby produces the rotational lock of the spring and on the other side the remaining part of the shorter teeth engages in recesses 38 of the friction disc 36, wherein the hub 11 is supported in turn on the disc part 7 by means of a cone 31.

The cone 31 which is provided with axial recesses 31a for keyed engagement with the external teeth 10 of the hub 11 serves to centre the disc part 7 on the disc part 5 and causes the fixing of the friction force on the friction discs 34 and 36.

Figure 1A:
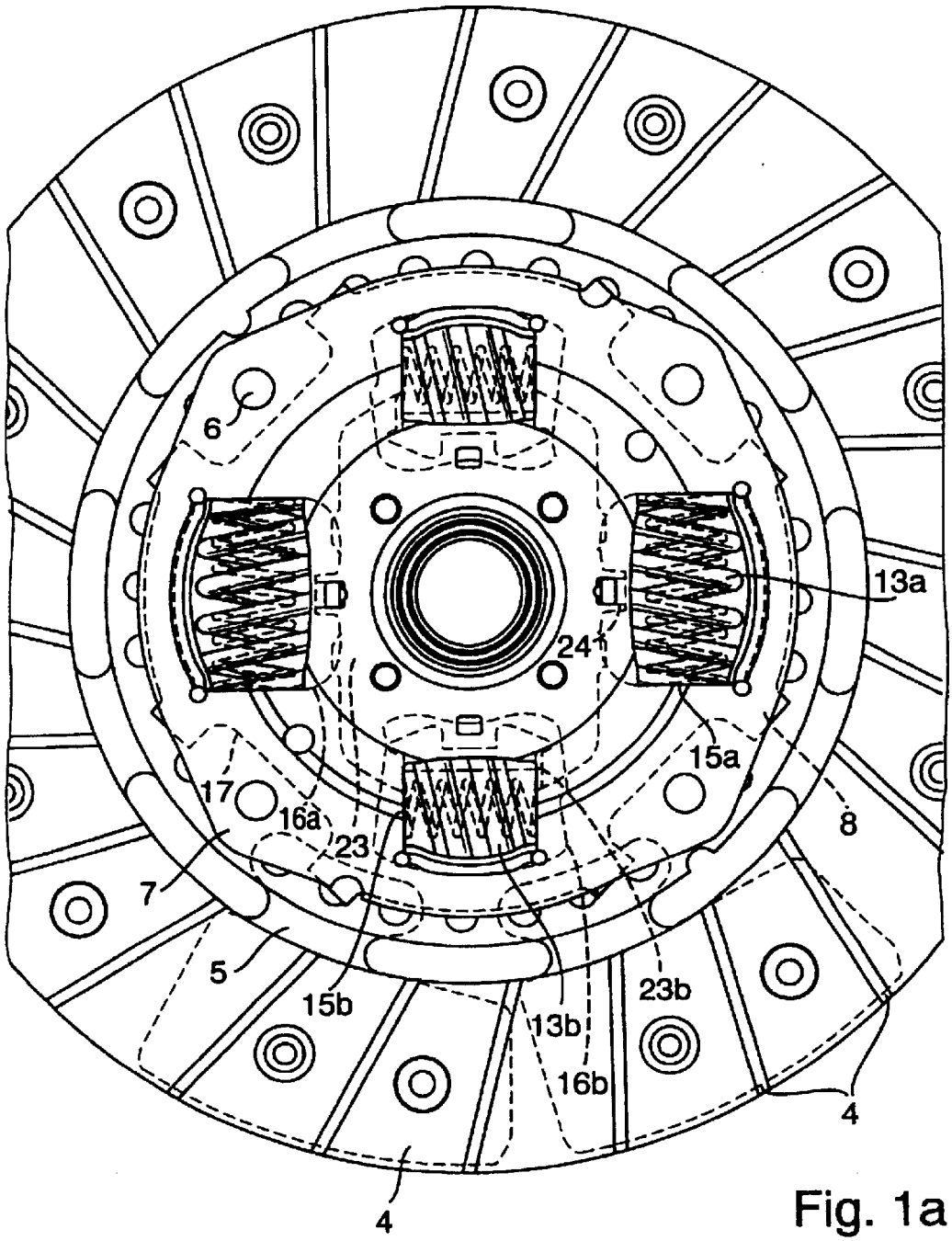
FIG. 1a shows a partial view of the torsion vibration damper.

FIG. 1a shows the torsion vibration damper 1 according to the invention in partial view from which for clarity the preliminary damper has been omitted and the parts arranged underneath the disc part 7 are shown by dotted lines. The parts described above are in detail: the first disc part 5 with the friction linings 4 which have grooves 4a is connected rotationally secured by the retaining bolts 6 to the second disc part 7, in-between—building up from below—are the friction control part 23 with its two groups of tabs 23b and 24 as well as the recesses 23a for the second spring set with the coil compression springs 13b which are also fitted into the recesses 14b, 15b of the two disc parts 5, 7. The first spring set with the coil compression springs 13a is housed in the recesses 14a, 15a of the two disc parts 5, 7. The flange 8 undertakes the control of the spring sets 13a, 13b by its recesses 16a, 16b for the two coil compression spring sets 13a, 13b in the turning angle of the main damper 3 defined by the recesses 17 and retaining bolts 6, wherein the recesses 16b have a larger cut-out section than the length of the coil compression springs 13b so that the entrainment of the springs 13b thereby forming a second main damper stage only takes place in the event of a larger turning angle.

Figure 2:
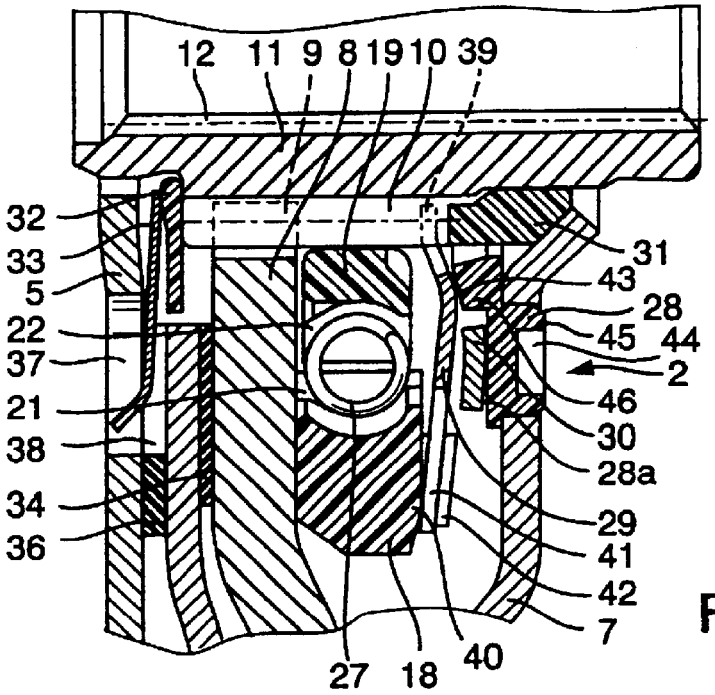
FIG. 2 shows a longitudinal sectional view of a part of FIG. 1 relating to the preliminary damper.

A more detailed explanation of the preliminary damper 2 with the component parts enclosing same is shown in the section from FIG. 1 provided in FIG. 2. The spring 29 according to the invention is tensioned between the friction ring 28 and the input part 18 of the preliminary damper 2. The inner circumference of the spring 29 is designed as an inner profiled section, preferably as internal teeth 39, which engages in the external profiled section, preferably external teeth 10 of the hub 11 and has a circumferentially arranged tooth flank play which allows relative rotation between the hub 11 and spring 29. The tooth flank play is selected so that the turning angle is smaller than the active area of the preliminary damper 2 so that in the case of large turning angles of the preliminary damper the friction arising through the friction faces 40a (FIG. 4) between the spring 29 and input part 18 of the preliminary damper on one side and between the spring 29 and friction ring 28 on the other side, after using up the free angle set between the teeth 10, 39, becomes active on the preliminary damper and produces a friction jump wherein prior to using up the free angle the spring co-rotates on the input part 18 without producing friction moments.

On the outer circumference the spring 29 has evenly distributed tongues 41 with approximately semi-circular shaped recesses 41a (FIG. 4) into which axially protruding pins 42 of the input part 18 project with a play which does not impede the rotation of the spring 29 in the free angle provided but allows assistance during assembly. The input part 18 is formed at the friction face 40a (FIG. 4) with the spring 29 as a rounded end 40 so that the spring 29 adjoins with the smallest possible contact bearing angle β and thus the friction face 40a (FIG. 4) is optimized.

The friction ring 28 forms with the spring 29 a designated friction surface 43 of a raised ring 46 whereby the ring surface drops in the direction of the internal diameter of the ring in order to produce a small contact bearing angle β. On the inner circumference of the friction ring 28 which is fitted rotationally secured by axially formed hollow pins 45 in recesses 44 of the disc part 7, a plate spring 30 having outwardly extending tabs 25a (FIG. 1) attached on the circumference and supported by these tabs 25a against the tabs 24 of the friction control part 23 (FIG. 1) adjoins the ring face 28a and causes a friction moment acting on the main damper 3.

Figure 3:
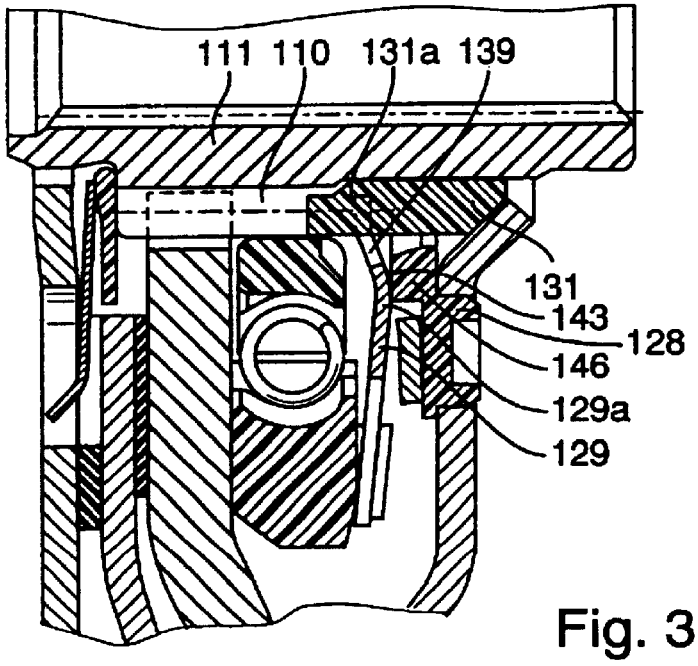
FIG. 3 shows a longitudinal sectional view of a part of another embodiment relating to the preliminary damper.

A further design model is shown in the form of a longitudinal section in FIG. 3. A torsion vibration damper 101 according to the invention and similar to the torsion vibration damper 1 has a hub 111 with axially shorter external teeth 110 in which the cone 131 as a second hub part engages with positive locking by means of axial teeth. Furthermore the cone 131 supports external teeth 131a, which preferably differ from the external teeth 110 of the hub 111, into which the spring 129 engages by means of internal teeth 139 producing the tooth flank play required for the delayed friction, whereby it is not necessary to adapt the spring 129 to the hub 111 and in the case of different requirements regarding the delayed friction system only the cone 139 need be changed in respect of the free angle which is to be varied.

A further design possibility relates to the friction ring 128 whose raised ring 146 has a flat ring face 143 wherein the friction face between the ring 146 and spring 129 is optimized in that on the spring 129 in the area of the contact surface with the ring 146 the circumferential bend 129a is adapted to the path of the friction face 143.

Figure 4:
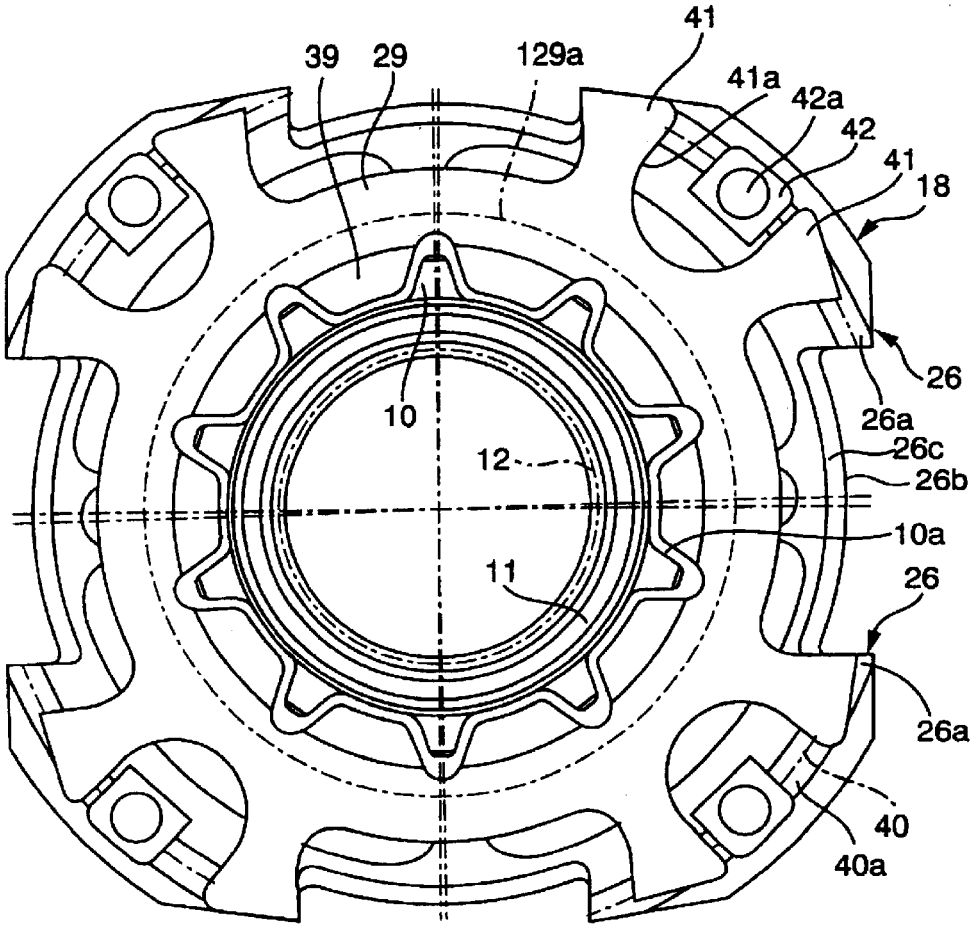
FIG. 4 is a view of the input part of the preliminary damper with fitted spring.

FIG. 4 shows the hub 11 having the internal teeth 12 which engage in the external teeth of a gearbox input shaft (not shown), and the external teeth 10 which engage with tooth flank play 10a in the internal teeth of the spring 29 whereby through a tooth flank play 10a in the circumferential direction of preferably ±2.5° the friction jump is controlled by means of the friction moment arising on the friction faces 40a between the spring 29 and the input part 18 of the preliminary damper 2 on one side and between the spring 29 and the friction ring 28, 128 (FIGS. 1, 2 or 3) on the other side, wherein the size of the friction moment is fixed by the axially acting spring rate of the spring 29.

The spring 29 has on its axial circumference radially extending tongues 41 which hold through their approximately semi-circular shaped recesses 41a the pins 42 which are formed with an axially aligned centre bore 42a wherein the play required for smooth setting the friction jump remains between the tongues 41 and pins 42. The pins 42 serve as stops against the direction of rotation.

The tongues 41 are widened out at their outer side so that additional friction surface is obtained which is optimized through a rounded end formation 40 of the input part 18 of the preliminary damper 2 relative to the contact bearing angle β of the spring 29 with the input part 18.

Fixing the preliminary damper 2, which is shown here without the output part 10 and the coil springs 27 (FIG. 1), on the flange 8 is undertaken by means of pins 26 extending axially at the corners 26a at the side remote from view and which fit into the window shaped recesses 16a, 16b of the flange 8 (FIG. 1). The edges 26c of the recesses 26b of the input part 18 of the preliminary damper 2 extending down in the axial direction thereby form a positive locking connection with the window shaped recesses 16a, 16b of the flange.

Figure 5:
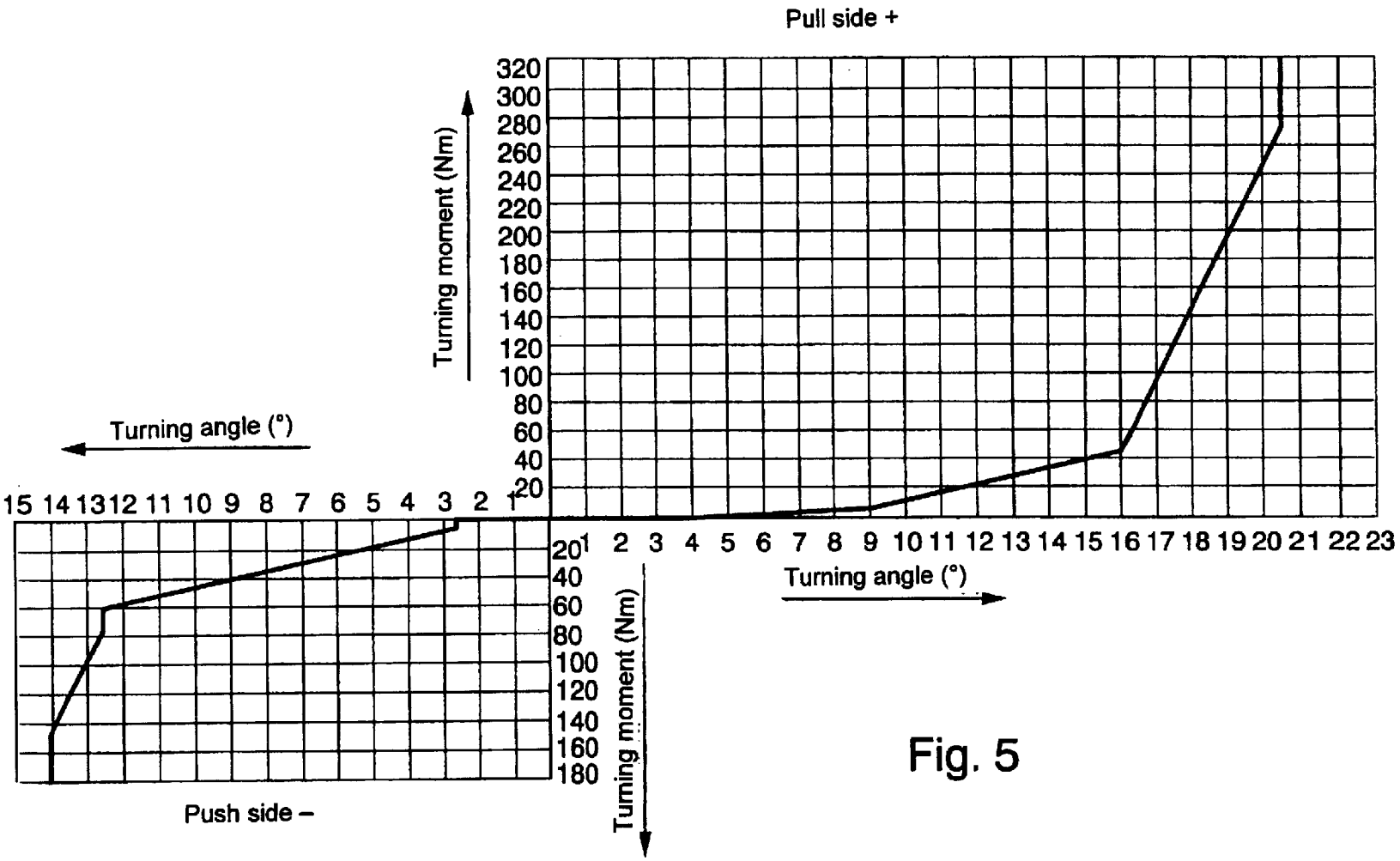
FIG. 5 shows a characteristic line of an embodiment.
Figure 6A:
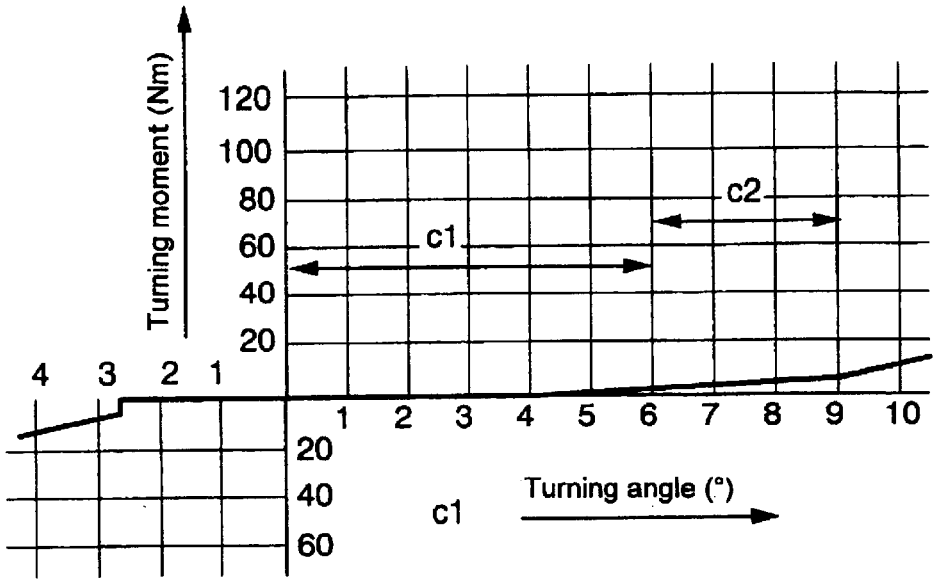
FIG. 6a shows a characteristic line of the preliminary damper whilst omitting the friction jump.

FIG. 5 shows the theoretical path of the turning moment in dependence on the turning angle. The path of the turning moment in the event of small turning angles in the direction of the pull side, thus in the direction in which the drive assembly turns the torsion vibration damper whilst the gearbox input shaft is still stationary is in this embodiment orientated up to about 9° from the damping properties of the two-stage preliminary damper 2 (FIG. 6a). The first stage of the main damper 3 is set after using up the free angle between the external teeth 10 of the hub 11 and the internal teeth 9 of the flange 8. The second main damper stage is set after using up the clearances of the recesses 16b of the flange with a turning angle of 16°. The increase in the turning moment is more than double the turning moment of the first main damper stage since the coil compression springs 13b of the second main damper stage have a higher stiffness compared with the coil compression springs 13a of the first stage. With a turning angle of about 20.5° in this embodiment the recess 17 of the flange 8 strikes against the retaining bolts 6 which connect the disc parts 5, 7 together so that the action of the main damper stage is terminated.

In the push side direction the free angle of the preliminary damper 2 is restricted to a turning angle of 2.5° so that the first main damper stage only starts from this turning angle. Also the start of the action and the stop of the second main damper stage are restricted to turning angles of 12.5° and 14° respectively.

FIG. 6a shows an enlarged area of FIG. 5 for a better illustration of the turning moment of the preliminary damper 2 over the turning angle. In the pull direction (right section of the drawing) the first preliminary damper stage cl operates at turning angles up to 6°. In the case of larger turning angles the clearance of the recesses 22 of the output part 19 of the preliminary damper 2 is used up and the second preliminary damper stage c2 is activated up to an angle of 9° at which the free angle between the external teeth 10 of the hub 11 and the internal teeth 9 of the flange 8 is used up and the main damper device is used. The method of operation of the preliminary damper is in this embodiment serial, that is the spring tension of the preliminary damper 2 remains during the action of the main damper 3. The preliminary damper 2 has during the push operation a restricted turning ability, namely a turning angle of 2.5° wherein only the first preliminary damper stage is activated.

Figure 6B:
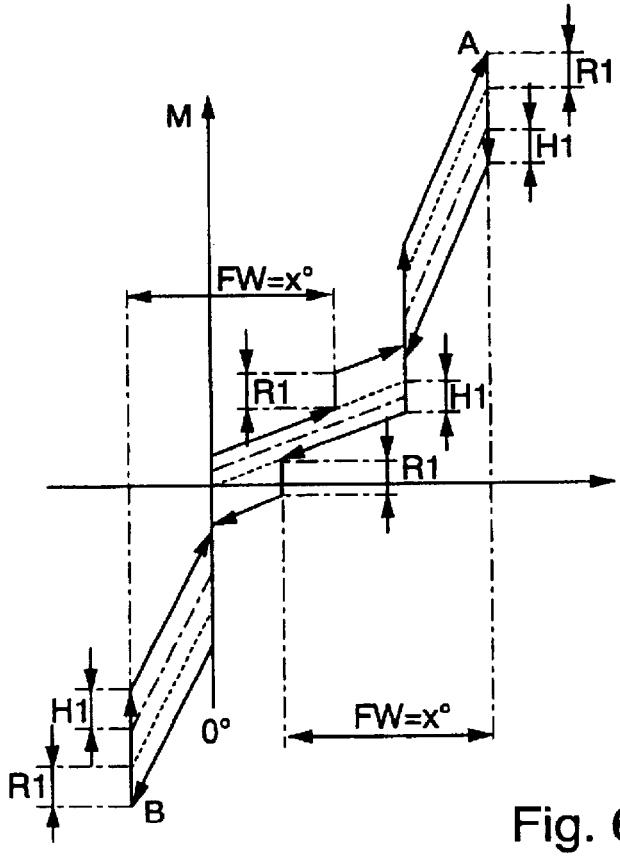
FIG. 6b shows the path of the friction moment for rotation over the entire active area of the preliminary damper with friction jump.

FIG. 6b shows the path of the turning moment M of an embodiment of the preliminary damper 2 according to the invention in dependence on the turning angle α taking into account the hysteresis H1 conditioned by the friction device.

The solid lines marked by arrows thereby show the path of the turning moment in the direction of the arrows when the preliminary damper 2 has turned and with a reversal of the turning angle, the dashed lines show the path of the curve of the turning moment without friction jump and the chain-dotted line shows the mean value of the turning moment corrected by the hysteresis without taking into account the friction jump. Starting with a turning angle α at which during push operation the preliminary damper is standing against the stop and only the first preliminary damper stage is active, the turning moment M in relation to the pull side decreases to a turning angle of 0°, the neutral phase of the first preliminary damper stage. The turning moment M then increases successively in dependence on the spring rate and the basic friction of the first preliminary damper stage up to the free angle FW between the internal teeth 39 of the spring 29 and the external teeth 10 of the hub 11. The spring 29 is then entrained by the hub 11 and produces through the resulting relative rotation a friction moment at the contact faces with the friction ring 28 and with the input part 18 of the preliminary damper 2 from which the illustrated friction jump R1 arises with the turning angle FW. The additional friction moment is superimposed on the friction moment of the first preliminary damper stage until the second preliminary damper stage by way of example c2 (FIG. 6a) is activated with an additional friction moment in the case of a turning angle of 6°. From the pitch of this curved section it is clear that the coil compression springs of the first preliminary damper stage have small stiffness than the coil compression springs of the second preliminary damper stage. At the end A of the active area of the preliminary damper 2 in the pull direction the turning angle is changed over whereby the hysteresis Hi acts in the reverse direction and the friction moment of the friction jump R1 ceases since now the relative rotation of the spring 29 opposite the hub 11 is provided again through the changed direction of rotation by means of the free angle relative to the hub 11. With a reverse turning angle of 3° in relation to the embodiment in FIG. 6a the second preliminary damper stage becomes inactive again and the friction moment M drops to the value of the first damper stage reduced by the hysteresis H1 in the event of a full deflection. A further decrease in the turning angle $\alpha$ causes the free angle to be used up between the spring 29 and the hub 11 in the reverse direction and the friction jump R1 is set analogous with the other positive turning direction wherein an angular stagger is observed in the case of the two turning directions which results from the non-uniformity of the active areas in the pull and push type operation of the preliminary damper 2 (FIG. 6a). With a reduction in the turning angle the first preliminary damper stage runs through the neutral phase and a negative turning moment M is built up up to the end B of the push direction.

Figure 7:
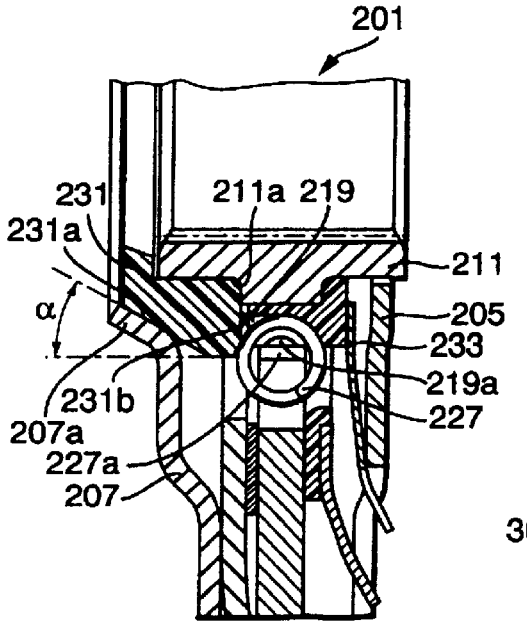
FIGS. 7 to 9 show in detail further embodiments of torsion vibration dampers.

FIG. 7 shows a detail of an embodiment with a torsion vibration damper 201 in which the input parts 205, 207 are tensioned relative to one another by means of the diaphragm spring 233, with axial interposition of the cone 231 which itself is axially supported on a radially extending shoulder 211a of the hub 211 so that a centering of the disc part 207 on the cone 231 is effected by the axial spring constant of the diaphragm spring 233. For optimisation of the centering of the side disc 207 on the cone 231 the cone angle $\alpha$ of the cone 231 and the disc part 207 in the region 207a of the contact surface of the cone 231 is set between $0<\alpha<45°$, preferably $25°<\alpha<35°$. On a relative rotation between the hub 211 and the disc parts 205, 207 a friction torque arises at the cone 231 which is determined in dependence on the cone angle alpha, the friction surfaces in contact with one another, the spring constant of the diaphragm spring 233 and the friction values of the relatively rotating parts. Thus the friction engagement between the region 207a and the cone 231 at the cone surface 231a and/or preferably between the cone 231 and the output of the energy store 219 of the pre-damper at the contact surface 231b can be adjusted so that here between the two parts 231, 219 a friction plate can be provided. The driven side control or biasing of the energy store 227 occurs by means of a control plate 227a engaging from the side of the disc part 205 in the energy store 227, which control plate engages in the toothing 219a of the hub 211.

Figure 8:
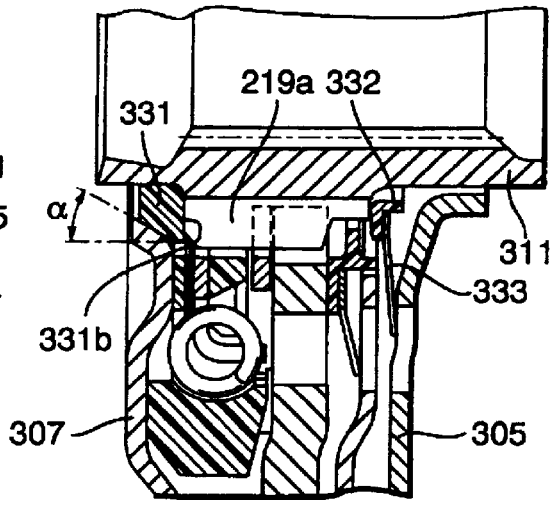

FIG. 8 shows a further construction, similar to the embodiment of FIG. 7, of a detail relating to the cone 331 with a cone angle $0<\alpha45°$, preferably $25°<\alpha<35°$ and a friction contact to the hub toothing 219a under formation of friction surface 331b, which produces a friction torque on a relative rotation of the radially outer disc part 305, 307 which are axially connected to one another, against the hub 311. The two disc parts 305, 307 are thus tensioned, against the hub 311, with axial interposition of the cone 331 on the one side and an abutment ring 332 on the other side by means of the axially operating diaphragm spring 333 which supports itself on the disc part 305 and on the abutment ring 332.

Figure 9:
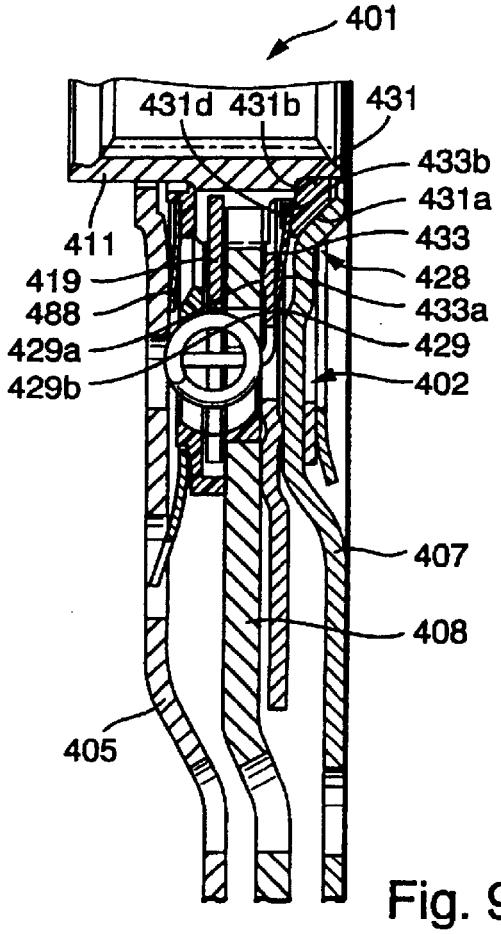

FIG. 9 shows a modified embodiment of the torsion vibration damper 1 in FIG. 1. The torsion vibration damper 401 of FIG. 9 illustrated as a part section has in the region of a pre-damper 402 a friction device 428 arranged so that the diaphragm spring 433 itself offers no friction function but only the tension of the friction control disc 429 against the cone 431 on the one hand as well as against the flange 408 on the other hand. In this way, a two stage construction of the friction device 438 (428?) is possible.

The first step is to find by an axial tensioning of the two radially outer disc parts 406, 407 which are connected with one another, with axial inter position of the cone 431 with the hub 411 by means of the diaphragm spring 488. By the pretensioning of the disc parts 405, 407 there arises a friction engagement on a relative rotation of the hub 411 against the disc parts 405, 407 as a first friction stage at the contact surface 431a between the cone 431 and the disc part 407, wherein on appropriate setting up of the friction conditions, the friction engagement in accordance with FIGS. 7 and 8 also in the contact region 431b between hub 411 and cone 431 can be transferred, in that for example the cone angle $\alpha$ of the contact surface 431c can be steeper wherein at this position the friction torque can be reduced and the centering of the disc part 405, 407 on the cone 431 is improved.

The second friction stage occurs on a relative rotation of the flange 408 relative to the friction control disc 429, thus in the working region of the pre-damper 402, wherein the friction torque is formed at the contact surface 429a of the friction control disc 429 to the flange 408 and the friction control disc 429 is hooked into the output part 419 and by means of a rotational play between the parts 429, 419 a slipping friction can be produced. In order to avoid the diaphragm spring 433 from moving relative to the cone 431 and/or the friction control disc 429, radially projecting extensions 433a, 433b are provided at the inner and outer circumferences, which with axially raised cams 431d of the cone 431 and recesses 429b of the friction control disc 429 form rotationally fast connections. The diaphragm spring 433 produces in the embodiment an increased tension of the cone 431 with the disc part 407 additionally to the action of the diaphragm spring 408, whereby especially on a misalignment of the drive unit in the gear box an improved tensioning and thus a better centering of the disc part 405 on the cone and a better defined friction engagement is possible.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. Torsion vibration damper, more particularly for motor vehicle clutch discs, having at least one preliminary damper acting in a predetermined angular region and having energy accumulators of lower stiffness, and at least one main damper acting in a predetermined angular region and having energy accumulators of greater stiffness, wherein the energy accumulators are active between the respective input and output parts of the preliminary and main dampers, and the output part of the torsion vibration damper is a hub provided with inner profiled sections to fit onto a gearbox shaft, as well as with a flange with inner profiled sections forming the output part of the main damper, wherein the inner profiled sections engage with the outer profiled sections of the hub and through this profiling the flange of the main damper is able to execute restricted relative rotation relative to the hub, as well as having at least one disc part which forms the input part of the main damper and holds friction linings, at least one friction device, and one spring which engages in the outer profiled sections and controls at least one part of the friction device and defines the friction engagement.

2. Torsion vibration damper according to claim 1 wherein the hub is in two parts.

3. Torsion vibration damper according to claim 1 wherein a restricted relative rotation forming a free angle is possible between the spring and hub.

4. Torsion vibration damper at least according to claim 1, wherein the relative rotation between the spring and the hub takes place in a part of the angular area of the operating range of the energy accumulator of the preliminary damper.

5. Torsion vibration damper at least according to claim 1, wherein the relative rotation between the spring and the hub causes a delay in the friction engagement defined by the spring about the free angle $\alpha$.

6. Torsion vibration damper at least according to claim 1 wherein the free angle $\alpha$ lies in the region of between ±2° and ±3°, and preferably amounts to ±2.5°.

7. Torsion vibration damper at least according to claim 1 wherein the spring has an inner profiled section complementary with the external profiled section of the hub.

8. Torsion vibration damper at least according to claim 1 wherein the external profiled section of the hub and the internal profiled section of the spring form teething which allows the free angle $\alpha$.

9. Torsion vibration damper at least according to claim 1 wherein the output part of the preliminary damper is connected rotationally secured to the hub.

10. Torsion vibration damper at least according to claim 1 wherein the input part of the preliminary damper is formed as a friction device.

11. Torsion vibration damper at least according to claim 1 wherein the spring is tensioned between the input part of the preliminary damper and disc part and/or a component part fixedly connected to same.

12. Torsion vibration damper at least according to claim 1 wherein the component part connected fixedly to the disc part is a second disc part spaced apart through spacer bolts.

13. Torsion vibration damper at least according to claim 1 wherein the component part is a friction ring fixed on the second disc part.

14. Torsion vibration damper at least according to claim 1 wherein the spring has an external profiled section with at least one radially outwardly pointing tongue.

15. Torsion vibration damper at least according to claim 1 wherein the tongue(s) has or have radially outwards an approximately semi-circular shaped recess.

16. Torsion vibration damper at least according to claim 1 wherein the tongue or tongues spreads or spread out towards the radial outer side.

17. Torsion vibration damper at least according to claim 1 wherein the input part of the preliminary damper has a rounded end on the axial side facing the spring in the area of the contact face between the input part and the spring which is tensioned with a contact bearing angle.

18. Torsion vibration damper at least according to claim 1 wherein the rounded end has such a pitch angle that the bearing angle $\beta$ of the spring is approximately $\beta=0$.

19. Torsion vibration damper at least according to claim 1 wherein the input part of the preliminary damper has at least one axially extending pin on the axial side facing the spring.

20. Torsion vibration damper at least according to claim 1 wherein the number of pins corresponds to the number of recesses on the tongues on the outer circumference of the spring.

21. Torsion vibration damper at least according to claim 1 wherein the pin (pins) engages (engage) with play in the recess of the tongue(tongues).

22. Torsion vibration damper at least according to claim 1 wherein the friction ring is fitted by at least one axially extending pin into a bore provided in the disc part.

23. Torsion vibration damper at least according to claim 1 wherein the friction ring has a ring located on the outer circumference, raised axially in the direction of the spring and forming an axial ring face.

24. Torsion vibration damper at least according to claim 1 wherein the resulting ring face drops towards its inner diameter.

25. Torsion vibration damper at least according to claim 1 wherein through the dropping ring face a phase angle $\gamma$ is formed so that the contact bearing angle $\beta$ of the spring on the friction ring is approximately $\beta=0$.

26. Torsion vibration damper at least according to claim 1 wherein the friction ring forms at least a part of the friction device of the preliminary and main damper.

27. Torsion vibration damper at least according to claim 1 wherein a further plate spring belonging to a friction device of the main damper is mounted outside the outer circumference of the raised ring of the friction ring.

28. Torsion vibration damper at least according to claim 1 wherein the plate spring is supported on axially aligned tabs of a friction control part which controls a part of the friction device of the main damper.

29. Torsion vibration damper at least according to claim 1 wherein the friction control part controls a second stage of the friction device of the main damper.

30. Torsion vibration damper at least according to claim 1 wherein the plate spring is supported axially against the radially inner non-raised ring face of the friction ring.

31. Torsion vibration damper at least according to claim 1 wherein the input part of the preliminary damper is fitted in windows provided for holding the energy accumulator in the input part of the main damper.

32. Torsion vibration damper at least according to claim 1 wherein correct fitting is produced through axially moulded pins provided for key engagement at the two radially inner corners of the window in the input part of the preliminary damper.

33. Torsion vibration damper at least according to claim 1 wherein the preliminary damper is housed axially between the disc parts.

34. Torsion vibration damper at least according to claim 1 wherein the external profiled section of the hub is continued in a second hub part and the spring engages by its inner profiled section into an external profiled section of the cone.

35. Torsion vibration damper at least according to claim 1 wherein the external profiled section of the hub differs from the external profiled section of the cone.

36. Torsion vibration damper, in particular according to one of the preceding claims, characterised in that the two disc parts are tensioned against the hub with axial interposition of the cone by means of an axially operating energy accumulator.

37. Torsion vibration damper at least according to claim 1 wherein a conical surface of the cone with a cone angle $\alpha$ forms a contact surface to one or both disc parts.

38. Torsion vibration damper at least according to claim 1 wherein the disc parts are centered on the cone.

39. Torsion vibration damper at least according to claim 1 wherein the cone angle alpha lies in the region $0°<\alpha<45°$, preferably $25°<\alpha<35°$.

40. A torsion vibration damper comprising at least one pre-damper, operative over a first angular range, with a first input part and a first output part having an initial relative position to each other, and first energy accumulators being compressible between the first input part and the first output part, at least one main damper, operative over a second angular range, with a second input part and a second output part, and second energy accumulators being compressible between the second input part and the second output part, the second energy accumulators having a higher degree of stiffness than the first energy accumulators, a damper output part and a friction control disc, a first diaphragm spring with an inner radius and an outer radius, wherein the friction control disc is tensioned by the first diaphragm spring against the flange, wherein the damper output part is constituted by a hub with an external profile, the second output part is constituted by a flange being received by the hub and having an internal profile that engages the external profile with angular play, the second input part is constituted by two side discs that are constrained to have no rotational mobility relative to each other, the first input part and the first output part are arranged axially between one of the two side discs and the flange, the first output part being rotationally constrained to the hub, the friction control disc is arranged axially between the flange and another of the two side discs, the friction control disc engaging the first output part with play, whereby the main damper is activated at a point within the first angular range, but is made operative only subsequent to a relative angular displacement between the first input part and the first output part from their initial position relative to each other, and wherein the first diaphragm spring and the friction control disc are constrained from rotating in relation to each other.

41. The torsion vibration damper of claim 40, wherein the friction control disc is in direct frictional engagement with the flange.

42. The torsion vibration damper of claim 40, further comprising a first friction ring, wherein the first diaphragm spring at the inner radius bears against the first friction ring.

43. The torsion vibration damper of claim 42, wherein the first friction ring is adjacent to and bears directly against one of the side discs.

44. The torsion vibration damper of claim 42, wherein the first diaphragm spring is axially tensioned by direct compressive contact at the outer radius with the friction control disc and at the inner radius with the first friction ring.

45. The torsion vibration damper of claim 42, further comprising at least one conical surface disposed between the hub and one of the side discs and serving to center said one of the side discs on the hub, wherein said conical surface is constituted by the first friction ring.

46. The torsion vibration damper of claim 40, further comprising at least one conical surface disposed between the hub and one of the side discs and serving to center said one of the side discs on the hub.

47. The torsion vibration damper of claim 40, wherein the pre-damper has a first characteristic curve divided into a first pre-damper stage and a second pre-damper stage, and the main damper has a second characteristic curve divided into a first main damper stage and a second main damper stage.

48. The torsion vibration damper of claim 40, wherein the pre-damper has a first friction stage comprising a second diaphragm spring bearing axially against one of the two side discs and bearing against the hub in a direction towards another of the two side discs.

49. The torsion vibration damper of claim 48, further comprising a second friction ring interposed between the second diaphragm spring and the hub.

50. The torsion vibration damper of claim 48, wherein the friction control disc and the second diaphragm spring are arranged on opposite sides of the flange.

51. A torsion vibration damper comprising:

at least one pre-damper, operative over a first angular range, with a first input part and a first output part having an initial relative position to each other, and first energy accumulators being compressible between the first input part and the first output part, at least one main damper, operative over a second angular range, with a second input part and a second output part, and second energy accumulators being compressible between the second input part and the second output part, the second energy accumulators having a higher degree of stiffness than the first energy accumulators, a damper output part and a friction control disc, a first diaphragm spring with an inner radius and an outer radius, wherein the friction control disc is tensioned by the first diaphragm spring against the flange, wherein the damper output part is constituted by a hub with an external profile, the second output part is constituted by a flange being received by the hub and having an internal profile that engages the external profile with angular play, the second input part is constituted by two side discs that are constrained to have no rotational mobility relative to each other, the first input part and the first output part are arranged axially between one of the two side discs and the flange, the first output part being rotationally constrained to the hub, the friction control disc is arranged axially between the flange and another of the two side discs, the friction control disc engaging the first output part with play, whereby the main damper is activated at a point within the first angular range, but is made operative only subsequent to a relative angular displacement between the first input part and the first output part from their initial position relative to each other, the first diaphragm spring and the friction control disc are constrained from rotating in relation to each other, and wherein the first diaphragm spring has projections at the outer radius and the friction control disc has recesses receiving the projections, whereby the first diaphragm spring and the friction control disc are constrained from rotating in relation to each other.

52. A torsion vibration damper comprising at least one pre-damper, operative over a first angular range, with a first input part and a first output part having an initial relative position to each other, and first energy accumulators being compressible between the first input part and the first output part, at least one main damper, operative over a second angular range, with a second input part and a second output part, and second energy accumulators being compressible between the second input part and the second output part, the second energy accumulators having a higher degree of stiffness than the first energy accumulators, a damper output part and a friction control disc, a first diaphragm spring with an inner radius and an outer radius, wherein the friction control disc is tensioned by the first diaphragm spring against the flange, a first friction ring, wherein the first diaphragm spring at the inner radius bears against the first friction ring, wherein the damper output part is constituted by a hub with an external profile, the second output part is constituted by a flange being received by the hub and having an internal profile that engages the external profile with angular play, the second input part is constituted by two side discs that are constrained to have no rotational mobility relative to each other, the first input part and the first output part are arranged axially between one of the two side discs and the flange, the first output part being rotationally constrained to the hub, the friction control disc is arranged axially between the flange and another of the two side discs, the friction control disc engaging the first output part with play, whereby the main damper is activated at a point within the first angular range, but is made operative only subsequent to a relative angular displacement between the first input part and the first output part from their initial position relative to each other, and wherein the first diaphragm spring is axially tensioned by direct compressive contact at the outer radius with the friction control disc and at the inner radius with the first friction ring.

53. A torsion vibration damper comprising at least one pre-damper, operative over a first angular range, with a first input part and a first output part having an initial relative position to each other, and first energy accumulators being compressible between the first input part and the first output part, at least one main damper, operative over a second angular range, with a second input part and a second output part, and second energy accumulators being compressible between the second input part and the second output part, the second energy accumulators having a higher degree of stiffness than the first energy accumulators, a damper output part and a friction control disc, a first diaphragm spring with an inner radius and an outer radius, wherein the friction control disc is tensioned by the first diaphragm spring against the flange, a first friction ring, wherein the first diaphragm spring at the inner radius bears against the first friction ring, at least one conical surface disposed between the hub and one of the side discs and serving to center said one of the side discs on the hub, wherein said conical surface is constituted by the first friction ring, wherein the damper output part is constituted by a hub with an external profile, the second output part is constituted by a flange being received by the hub and having an internal profile that engages the external profile with angular play, the second input part is constituted by two side discs that are constrained to have no rotational mobility relative to each other, the first input part and the first output part are arranged axially between one of the two side discs and the flange, the first output part being rotationally constrained to the hub, the friction control disc is arranged axially between the flange and another of the two side discs, the friction control disc engaging the first output part with play, whereby the main damper is activated at a point within the first angular range, but is made operative only subsequent to a relative angular displacement between the first input part and the first output part from their initial position relative to each other.

54. A torsion vibration damper comprising at least one pre-damper, operative over a first angular range, with a first input part and a first output part having an initial relative position to each other, and first energy accumulators being compressible between the first input part and the first output part, at least one main damper, operative over a second angular range, with a second input part and a second output part, and second energy accumulators being compressible between the second input part and the second output part, the second energy accumulators having a higher degree of stiffness than the first energy accumulators, a damper output part and a friction control disc, wherein the damper output part is constituted by a hub with an external profile, the second output part is constituted by a flange being received by the hub and having an internal profile that engages the external profile an angular play, the second input part is constituted by two side discs that are constrained to have no rotational mobility relative to each other, the first input part and the first output part are arranged axially between one of the two side discs and the flange, the first output part being rotationally constrained to the hub, the friction control disc is arranged axially between the flange and another of the two side discs, the friction control disc engaging the first output part with play, whereby the main damper is activated at a point within the first angular range, but is made operative only subsequent to a relative angular displacement between the first input part and the first output part from their initial position relative to each other, the pre-damper has a first friction stage comprising a second diaphragm spring bearing axially against one of the two side discs and bearing against the hub in a direction towards another of the two side discs, and wherein the friction control disc and the second diaphragm spring are arranged on opposite sides of the flange.

* * * * *